UNITED STATES PATENT OFFICE.

OTTO EPPENSTEIN, OF JENA, GERMANY, ASSIGNOR TO THE FIRM OF CARL ZEISS, OF JENA, GERMANY.

PROCESS FOR THE MANUFACTURE OF OPTICAL SQUARES.

1,112,418.     Specification of Letters Patent.     Patented Sept. 29, 1914.

No Drawing.     Application filed June 4, 1914. Serial No. 842,988.

*To all whom it may concern:*

Be it known that I, OTTO EPPENSTEIN, a citizen of the German Empire, residing at Jena, Germany, have invented a new and useful Process for the Manufacture of Optical Squares, of which the following is a specification.

The present invention relates to a process for the manufacture of optical squares composed of two silvered metal plates and an intermediate member of metal connecting the same. Speaking generally, it is hardly possible, to make such optical squares, when employing one of the usual methods of manufacture, of a single piece, e. g. by casting it or by working it out of a solid piece of metal, as on the body of an optical square so made the reflecting surfaces are not of sufficiently easy access, to be polished conveniently and yet properly. If, on the other hand, it should be decided to make the optical square in separate parts, to polish the parts carrying the reflecting surfaces by themselves and then to assemble the optical square, it is attended with difficulties, to connect the separate parts together durably, without causing strains in the finished reflecting surfaces. According to the invention this manufacturing difficulty is overcome by adopting the following process. A mold is made from a material, which allows of its being given a polish at the surfaces corresponding to the reflecting surfaces. To this mold metal, e. g. copper, is applied in a finely divided state, and the thus formed body of the optical square is then separated from the mold. The reflecting surfaces then require no further polishing. The application of the metal in a finely divided state may be effected by electrolysis or by squirting on molten metal. A special advantage of this process is, that by it a perfect uniformness of the material throughout the whole optical square is more easily obtainable.

The silvering of the reflecting surfaces may be carried out after the optical square has been separated from the mold. It is particularly advantageous, to use glass or quartz for the material of the mold and to silver those polished surfaces of the mold, which correspond to the reflecting surfaces, beforehand; on separating the optical square from the mold, the silvering will adhere to the reflecting surfaces. The manufacture of concave reflectors of metal by a similar process is already known. In that case, however, it was a question of replacing the comparatively difficult polishing of metal by the more easy polishing of another material; the avoidance of building up the reflector from several parts was no part of the problem.

I claim:

1. A process for the manufacture of optical squares composed of two silvered metal plates and an intermediate metal member connecting the same, consisting in applying to a mold, the material of which allows of its being given a polish at the surfaces corresponding to the reflecting surfaces of the square, metal in a finely divided form and thereupon separating the square from the mold.

2. A process for the manufacture of optical squares composed of two silvered metal plates and an intermediate metal member connecting the same, consisting in applying to a glass mold, the surfaces of which corresponding to the reflecting surfaces of the square are silvered, metal in a finely divided form and thereupon separating the square from the mold.

OTTO EPPENSTEIN.

Witnesses:
  PAUL KRÜGER,
  RICHARD HAHN.

Copies of this patent may be obtained for five cents each, by addressing the "Commissioner of Patents, Washington, D. C."